(12) United States Patent
Otter et al.

(10) Patent No.: US 10,468,712 B2
(45) Date of Patent: Nov. 5, 2019

(54) POROUS CARBON PARTICLES HAVING A CORE/SHELL STRUCTURE, AND METHOD FOR PRODUCING SAME

(71) Applicant: Heraeus Quarzglas GmbH & Co. KG, Hanau (DE)

(72) Inventors: Matthias Otter, Hamm (DE); Jörg Becker, Niddatal (DE); Sascha Pihan, Aschaffenburg (DE); Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 190 days.

(21) Appl. No.: 15/113,660

(22) PCT Filed: Jan. 26, 2015

(86) PCT No.: PCT/EP2015/051508
§ 371 (c)(1),
(2) Date: Jul. 22, 2016

(87) PCT Pub. No.: WO2015/110637
PCT Pub. Date: Jul. 30, 2015

(65) Prior Publication Data
US 2017/0008769 A1    Jan. 12, 2017

(30) Foreign Application Priority Data
Jan. 24, 2014 (EP) .................... 14152561

(51) Int. Cl.
*H01M 4/133* (2010.01)
*H01M 10/0525* (2010.01)
(Continued)

(52) U.S. Cl.
CPC ......... *H01M 10/0525* (2013.01); *C01B 32/05* (2017.08); *H01M 4/133* (2013.01);
(Continued)

(58) Field of Classification Search
None
See application file for complete search history.

(56) References Cited

U.S. PATENT DOCUMENTS 6,355,377 B1    3/2002    Sheem et al.
2013/0209891 A1    8/2013    Neumann et al.

FOREIGN PATENT DOCUMENTS

| CN | 103168002 A | 6/2013 |
| CN | 103875099 A | 6/2014 |
| WO | 2012136513 A1 | 10/2012 |

OTHER PUBLICATIONS

Office Action dated Feb. 23, 2017 in CN Application No. 201580005293.5.

(Continued)

*Primary Examiner* — Tracy M Dove
(74) *Attorney, Agent, or Firm* — Panitch Schwarze Belisario & Nadel LLP (57) ABSTRACT

A method for producing carbon particles having a core/shell structure includes infiltrating a pore-containing template material with a first precursor for carbon of a first variety, carbonizing the first precursor to form a deposit of the carbon of the first variety, infiltrating the remaining pore space with a second precursor for carbon of a second variety to form a second deposit of the carbon of the second variety which has a second porosity lower than the first porosity, and removing the template material to form the carbon particles. The template material is provided as template particles and the first precursor is provided as precursor particles of meltable and polymerizable material. The infiltration occurs in the molten phase so that the first precursor is foamed before or during the carbonization to form a pore-containing carbon foam. In an intermediate product, pores of the template material are at least partially filled.

8 Claims, 5 Drawing Sheets

(51) Int. Cl.
C01B 32/05 (2017.01)
H01M 4/36 (2006.01)
H01M 4/587 (2010.01)

(52) U.S. Cl.
CPC .......... H01M 4/366 (2013.01); H01M 4/587 (2013.01); *C01P 2004/51* (2013.01); *C01P 2006/12* (2013.01); *C01P 2006/14* (2013.01); *C01P 2006/16* (2013.01)

(56) References Cited

OTHER PUBLICATIONS

Search Report (German language) dated Jun. 6, 2014 in EP Application No. 14152561.8.
Eder et al., "Thermal Decomposition of Petroleum and Coal Tar Pitches by Thermogravimetry," Die Angewandte Makromolekulare Chemie, vol. 138, pp. 91-101 (1986).
Manabile, "Study of the early stages of carbonisation of some pitch materials of different composition," Master of Science Thesis, University of Pretoria, pp. 1-84 (Jul. 2009).
Lei et al., "Porous mesocarbon microbeads with graphitic shells: constructing a high-rate, high-capacity cathode for hybrid supercapacitor," Scientific Reports, vol. 3, pp. 1-6 (2013).
Song et al., "Hierarchical Porous Core-Shell Carbon Nanoparticles," Chemistry of Materials, vol. 21, pp. 1524-1530 (2009).
International Search Report dated Apr. 22, 2015 in International Application No. PCT/EP2015/051508.
International Preliminary Report on Patentability dated Aug. 4, 2016 in International Application No. PCT/EP2015/051508.

POROUS CARBON PARTICLES HAVING A CORE/SHELL STRUCTURE, AND METHOD FOR PRODUCING SAME

CROSS-REFERENCE TO RELATED APPLICATIONS

This application is a Section 371 of International Application No. PCT/EP2015/051508, filed Jan. 26, 2015, which was published in the German language on Jul. 30, 2015, under International Publication No. WO 2015/110637 A1 and the disclosure of which is incorporated herein by reference.

BACKGROUND OF THE INVENTION

The present invention relates to porous carbon particles with a core/shell structure, comprising a core of a first carbon variety with a first porosity and a shell which surrounds the core and consists of a second carbon variety with a second porosity which is lower than the first porosity.

Furthermore, the present invention relates to a method for producing a porous carbon product having a core/shell structure. The method comprises the following steps:
a) providing a pore-containing template material consisting of inorganic material;
b) infiltrating the pores of the template material with a first precursor for carbon of a first variety;
c) carbonizing the first precursor so that, in the pores, a first deposit of the carbon of the first variety is formed with a first porosity;
d) infiltrating pores remaining after carbonizing with a second precursor for carbon of a second variety;
e) carbonizing the second precursor, wherein a second deposit of the carbon of the second variety is formed with a second porosity lower than the first porosity; and
f) removing the template material.

In the course of the development of portable electronic devices, the demand for rechargeable batteries ("accumulators" or secondary batteries") is increasing. Fundamental requirements are high cell voltage, high charging capacity at an equivalence weight which is as low as possible. Moreover, a long cycle life is required, i.e. a small charging loss during charging and discharging.

Recently, lithium secondary batteries have gained technical importance. In these batteries, a cathode (positive electrode) and an anode (negative electrode) are provided consisting of a material which is suited for the insertion and removal (intercalation and de-intercalation) of lithium ions, and which adjoins an electrolyte which allows the movement of the lithium ions. As anode material, porous carbon structures are used that can reversibly incorporate and release lithium ions without the structural and electrical properties thereof being changed to a considerable extent.

Moreover, lithium-sulfur secondary batteries are being developed and are considered to be one of the very promising secondary batteries of the next generation. In its simplest configuration, the cell consists of a positive electrode of sulfur and of a negative electrode of lithium. The theoretical capacity is 1,675 mAh/g, on the assumption that all sulfur atoms are completely reduced to $S^{2-}$ upon discharge of an electrode, and the rated voltage is 2.2 V/cell. The component sulfur which is involved in the reaction (or sulfur-containing organic compounds) acts as an electrical insulator, so that the progress of an electrochemical reaction requires a permanent intimate contact with an electrically highly conductive component, such as carbon.

To ensure an electrical or ionic conduction of the electrodes, liquid electrolytes, often polar organic solvents, are used. These serve not only as ion transport media between the anode and cathode, but also as ion conductors within a sulfur-containing electrode.

This poses, on the one hand, the problem that the electrode structure is to provide a large surface occupied with electrochemical active material and to allow an unhindered access of the electrolyte liquid to the active material. These requirements can be met by a so-called hierarchically structured porosity of the electrode material, wherein large surfaces are provided by pores in the nanometer range that are accessible via a continuous macroporous transport system for the electrolyte.

On the other hand, active material, such as sulfide and polysulfide discharge products, can dissolve in the electrolyte and can be discharged thereby. The components diffused away from the electrode are no longer available for the further electrochemical reaction, whereby the charging capacity is decreasing. It is also possible that discharge products are irreversibly precipitated out of the electrolyte solution, whereby the charging capacity is also decreasing.

These disadvantageous effects are avoided with an electrode which contains porous carbon particles with core/shell structure according to the above-mentioned type, as is known from International Application Publication No. WO 2012/136513 A1. The known porous carbon particle comprises an inner layer of a first carbon variety which adjoins a cavity and which is in contact with an outer layer of a second carbon variety, the inner layer consisting of non-graphitic carbon and having a higher porosity than the outer layer.

For the preparation thereof, a pore-containing template material is used in the form of a $SiO_2$ soot produced by gas phase deposition. In the pores of the $SiO_2$ template material, two carbon varieties that differ from each other in their porosity are deposited one after the other, based on a two-stage infiltration process. In the first infiltration stage, the pores are infiltrated with a carbon precursor in the form of a carbohydrate solution, such as a sugar-water solution which, after carbonizing, yields non-graphitic carbon with a high porosity. The pore volume remaining or released after carbonizing, the first carbon precursor (C precursor) is homogeneously infiltrated in the second infiltration stage with a different carbon precursor, such as liquid pitch, which after carbonizing yields graphite-like carbon of a porosity lower than the porosity of the non-graphitic carbon. "Precursor for carbon" or "C precursor" stands here for a carbonaceous compound which can be deposited as a deposit on a substrate and converted by way of carbonizing into carbon. The carbonizing of the first C precursor leads to a carbon with a first porosity. The carbonizing of the second C precursor leads—under identical conditions of the carbonizing process—to a carbon with a second porosity lower than the first porosity.

After removal of the template material, a carbon structure of hierarchical porosity is obtained. The removed template material leaves cavities in the mesopore and macropore range that are three-dimensionally interlinked via the former sinter necks. Mesopores are typically of a pore size in the range of 2 nm to 50 nm. The carbon structure surrounding this linked cavity consists of a multi-layered carbon layer. The inner layer facing the cavity consists of predominantly non-graphitic carbon of a high microporosity. The low-porosity carbon of the outer layer reduces the microporosity and the specific surface area of the composite material on the whole without impeding the accessibility of a liquid electrolyte to the high-porosity turbostratic carbon of the inner layer. This structure of the carbon skeleton can be called "core/shell structure". It is suited for retaining electrode material.

The publication of Marek Eder et al., "Thermal Decomposition of Petroleum and Coal Tar Pitches by Thermogravimetry"; in: Die Angewandte Makromolekulare Chemie, 1 Jan. 1986 (1986-01-01), pages 91-101, relates to a thermogravimetric analysis of coal tars and petroleum pitch in air and in nitrogen. The reaction order and the activation energy are determined for each decomposition stage. This yields data on the weight loss of the different pitches.

The Master-of-Science thesis by Segaula Isaac Manabile, "Study of the early stages of carbonisation of some pitch materials of different composition," 31 Jul. 2009 (2009-07-31), pages 1-104, University of Pretoria (URL: http://up-etd.up.ac.za/thesis/available/etd-11292009-204923/), relates to the origin and development of the mesophase in the case of different pitch modifications. Results of FT-IR studies and thermogravimetric measurements are described.

The publication of Yu Lei et al., "Porous mesocarbon microbeads with graphitic shells: constructing a high-rate, high-capacity cathode for hybrid supercapacitor," in: SCIENTIFIC REPORTS, Vol. 3, 21 Aug. 2013 (2013-08-21), describes a porous carbon product with core/shell structure which is produced from mesocarbon microbeads (MCMB). The core consists of amorphous porous carbon and the shell consists of graphitic carbon.

The publication of Chang Song et al., "Hierarchical Porous Core-Shell Carbon Nanoparticles," Chemistry of Materials, Vol. 21, No. 8, 28 Apr. 2009 (2009-04-28), pages 1524-1530, discloses carbon nanoparticles of a mesoporous core and a microporous shell. The mesoporous walls consist of a few graphene layers which leave hollow carbon nanoparticles after removal.

U.S. Pat. No. 6,355,377 B1 discloses a negative/active material for rechargeable lithium batteries which consist of a core of crystalline carbon and a shell of semi-crystalline carbon, the shell enclosing metal borides and metal carbides and comprising a turbostratic layer.

In the method known from International Application Publication No. WO 2012/136513 A1, the solvent-containing cane sugar layer which is deposited on the template material is dried and carbonized by heating in nitrogen at 700° C. By evaporation of the water and by carbonization, it loses up to 75% of its original mass. Therefore, the infiltration process leads in principle to a small thickness in the range of a few nanometers for the deposited turbostratic carbon layer. At least 50% of the remaining pore volume is occupied with carbon of the second variety.

It has been found that in the known carbon particles, the porosity of the turbostratic carbon of the inner layer which is distinguished by micropores with pore sizes in the range of less than 2 nm and also the mass distribution of the carbon varieties within the carbon structure are not optimal with respect to retention capacity for active material and charging capacity of the battery produced therefrom.

It is therefore an objective of the present invention to provide porous carbon particles with a core/shell structure and hierarchical porosity that exhibit a high retention capacity for active material and are distinguished by a high capacity and a low capacity loss during use as electrode material for a lithium or lithium-sulfur secondary battery.

Moreover, it is an objective of the present invention to indicate a method for the low-priced production of such carbon particles.

BRIEF SUMMARY OF THE INVENTION

Starting from the above-mentioned method with method steps (a) to (f), a method according to the present invention is achieved by a method modification having the following measures:

(A) the template material is provided in the form of template particles and the first precursor is provided in the form of precursor particles of a first species of fusible and polymerizable material, wherein for infiltrating according to method step (b), a particle mixture containing template particles and precursor particles of the first species is melted and the melt of the first precursor thereby penetrates into the pores of the template particles and foams up therein prior to or during carbonizing according to method step (c) under polycondensation into a pore-containing carbon foam, so that an intermediate product is obtained in which pores of the template material are filled at least in part with a carbon foam, and (B) the intermediate product is ground into intermediate-product particles and the second precursor for the carbon of the second variety is provided in the form of precursor particles of the second species of fusible material, wherein for infiltrating according to method step (c), a particle mixture containing intermediate-product particles and precursor particles of the second species are melted and the melt of the second precursor thereby penetrates into pores of the carbon foam and closes the same at least in part after carbonizing according to method step (e) as a shell of the core/shell structure.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The method according to the present invention, like the generic method, starts preferably from a template material of porous inorganic material with hierarchical material distribution. This material distribution is, e.g., achieved via a process of the gas phase deposition, as explained in International Application Publication No. WO 2012/136513 A. The primary particles created during gas phase deposition agglomerate into nanoparticles of different sizes while traveling to the deposition surface, these nanoparticles, in turn, forming larger, more or less spherical units by way of aggregation or agglomeration. Typically, these spherical units are sintered in a soot body and interlinked via so-called "sinter necks". The individual particles of the template material are produced from the soot body and thereby have a porous coherent skeleton. This template material which is sufficiently known from the prior art is subjected to a multistage infiltration process in which, by comparison with the known method, the following method modifications are made.

1. First of all, powders consisting of both the porous template material and of the first precursor for the first carbon variety ("first C precursor") are produced. These powders are mixed together and the homogeneous powder mixture is heated to such a high degree that the particles of the first C precursor assume a low viscosity and the low-viscosity mass can penetrate into the pores of the template and fill the pores as homogeneously as possible. A liquid solvent for the infiltration of the first C precursor is here omitted. Organic carbon compounds which upon heating will polymerize, e.g. saccharose, fructose or glucose, are for instance suited as the first precursor for the carbon of higher porosity. It is often not possible to assign a discrete melting temperature to such polymerizable C precursors, but just a melting range. If the low-viscosity C precursor material is in intimate contact with the template material, it can penetrate into the pores thereof and fill them at least in part. In this process the first C precursor or its potential incipient decomposition products form a deposit on the walls of the infiltrated pores.

Upon further heating, the deposited layer material is foamed as uniformly as possible before final carbonization. The foam formation is based on the separation of functional groups in the polymerization of the first C precursor, which form gaseous components, such as water and carbon dioxide. Due to the foam formation, the deposition volume is considerably increasing, so that the available pore space is filled substantially, ideally completely, with carbonaceous foam after only one single infiltration. The pores of the foam are substantially mesopores and macropores with pore sizes of more than 2 nm.

To ensure that the pores forming during foam formation are the particularly desired mesopores, a limitation of the bubble growth is helpful during foam formation. In the method according to the present invention, the limitation of the bubble growth is substantially due to a spatial restriction of the foam formation. It follows from the size of the pores of the template material and the amount of the first C precursor introduced into the pores in an infiltration process. The mean pore size of the template material is typically about 400 nm to about 1000 nm. The amount of the first C precursor is comparatively great by comparison with a solvent-based method.

The foam is carbonized by heating to a temperature of typically more than 500° C. The foam is here converted into carbon of a comparatively high porosity with mesopores, but also macropores, which forms a non-graphitizable turbostractic carbon. During carbonization, the volume of this deposit will slightly shrink, so that a substantially filled pore structure will remain, the pore structure forming the core of the core/shell structure of the carbon particle. This three-dimensional morphology of the carbonized, typically turbostratic carbon, will also be designated in the following as "carbon foam," consisting of "carbon foam pores". It significantly differs from the known, substantially layer-like carbon deposit produced by solvent-based deposition.

In contrast to graphite with crystallographic long-range order of graphene layers, the layer structure in turbostratic carbon is more or less disordered. Carbon with turbostratic layer structure is not graphitizable by heating and is here also called "non-graphitizable carbon."

2. The intermediate product obtained in this way is a template material penetrated by carbon foam. It is normally obtained as an agglomerated mass in which the grains are connected by way of superficial carbon adhesions. It is ground into intermediate-product particles according to the present invention.

The grinding process for the intermediate product can produce a new surface and is therefore carried out as gently as possible. It leads to intermediate product particles with particle sizes conforming substantially to the desired final size of the carbon particles. The intermediate product is, e.g., ground into intermediate-product particles with particle sizes in the range of 5 μm to 100 μm, wherein particle sizes are preferably produced in the range of 25 μm to 75 μm.

The grinding process is carried out in advance of or at the same time as the mixing with precursor particles of the second species. The aim is a homogeneous powder mixture consisting of the intermediate product particles and of the precursor particles of the second species.

3. The homogeneous powder mixture consisting of intermediate-product particles and precursor particles of the second species is heated. The particles of the second C precursor form a low-viscosity mass which covers the intermediate product particles as a thin outer skin, and also penetrates into open pores of the porous core material and thereby closes them to the outside completely or in part. This effect is desired, and a comparatively small amount of precursor material of the second species is enough for this. This type of infiltration, in which the volume of the substance to be infiltrated (namely the second C precursor) is not enough to completely fill the existing pore space, may also be called "inhomogeneous infiltration."

The outer skin is carbonized in the standard way by heating to a sufficiently high temperature in an atmosphere which is low in oxygen. The outer skin is here converted into carbon with a comparatively low porosity, which may e.g. be called "graphite-like carbon," and forms the shell of the core/shall structure of the carbon particles to be produced.

The second C precursor is thus, for instance, suited for the production of so-called "graphitizable carbon"; i.e., a carbon of the second carbon variety which is comparatively dense and is subjected during carbonization to a noticeable relocation of graphene layers towards a graphite structure and which is also called "soft carbon" in the literature. By removal of the template material, e.g. by chemical dissolution, the volume previously occupied by spherical nanoparticles and their aggregates/agglomerates becomes free and subsequently represents cavities or voids that are three-dimensionally interlinked via former, now opened, sinter necks. These voids shall also be called extemplate pores hereinafter and typically have mean sizes in the range of 100 nm to 1,000 nm, wherein the connection channels via the former sinter necks may be much smaller (typically <50 nm, for instance 2 nm to 50 nm).

The core of the carbon particles produced in this way has a large pore volume. The former template material is fully converted into voids (hereinafter also called "extemplate pores"), and the original pores of the template material are largely filled with porous carbon foam (i.e., with carbon foam pores). Both pore types provide a large free surface in the core of the carbon particles. The carbon particles are surrounded more or less completely to the outside by a shell of (graphite-like) carbon of low porosity, and the high-porosity core region is thereby closed at least in part. Moreover, the low-porosity, preferably graphite-like layer structure of the shell shows a higher electrical conductivity than the high-porosity core.

During use of the carbon particles produced in this way as electrode material, the extemplate pores, which are three-dimensionally interlinked via relatively narrow channels (former sinter necks), and the carbon foam pores provide a large pore volume which is suited for the incorporation and fixation of electrolytic active material such as sulfur or sulfur compounds and complexes of a lithium-sulfur accumulator. By contrast, the shell which closes this pore-rich region to the outside comprises predominantly smaller pores in the range of 20 nm to 250 nm. The low-porosity carbon of the shell reduces the permeability for the active material and thereby counteracts a washing out of active material out of the voids, but without barring the accessibility of a liquid electrolyte to the high-porosity core.

The core of the carbon particles produced in this way is thus distinguished by high porosity with a large absorption volume for active material and allows a high charging capacity, whereas the shell is less impermeable for active material also at a small thickness, but allows an electrolytic access to the core and thereby ensures a high retention capacity and a small capacity loss.

The relatively dense shell fulfills the function regarding the retention capacity already at a small mean thickness of, e.g., not more than 5 μm. Due to the "inhomogeneous infiltration," only the near-surface pores of the carbon particles are closed. Greater thicknesses are at the expense of the available internal pore volume and thus the storage capacity. Especially with respect to the mechanical stability of the carbon skeleton and a high electrical conductivity, the mean layer thickness is however at least 500 nm.

For these reasons, "inhomogeneous infiltration" is carried out such that during infiltration according to method step (d) the amount of carbon of the second variety is set to be so low that the pores of the carbon foam are filled on average up to not more than 30%, preferably up to not more than 10%.

Fusible organic carbon compounds with a certain amount of separable condensate are in principle suited as a precursor for the high-porosity carbon. This includes pitches on condition that these can be decomposed by polycondensation, for instance petroleum pitch. Preferably, however, a carbohydrate is used as the first precursor for the infiltration according to method step (b), the carbohydrate separating at least 30%, preferably at least 50%, of its initial mass as gas prior to the polycondensation reaction.

The greater the separated gas volume, the higher is the porosity of the core after carbonization. Carbohydrates, particularly sugar, such as saccharose, fructose, or glucose, are fusible and have a high water content which evolves during polymerization as a reaction product and contributes to the formation of bubbles. They represent non-graphitizable C precursors which, after carbonization, are distinguished by a high specific surface area.

It has turned out to be advantageous when the core after carbonization has a specific BET surface area in the range of 400-600 m$^2$/g, and the shell has a specific BET surface area in the range of less than 50 m$^2$/g.

In the core material, these data refer in the case of the core material to surfaces which are free at both sides and are occupied neither by shell material nor by template material, and—in the case of the shell—also to surfaces which are free at both sides and are unoccupied. The specific surface area is determined according to DIN ISO 9277—May 2003 (determination of the specific surface area of solids by gas adsorption according to the BET method).

The high specific surface area and the large pore volume of the core promote the absorption capacity of active material, whereas the low specific surface area of the shell characterizes the retention capacity thereof and also guarantees on the whole an electrical conductivity of the carbon particles that is as high as possible Preferably, the core contains macropores in the size range of 250 nm to 10,000 nm, which occupy a specific volume of at least 1.0 cm$^3$/g, preferably at least 2 cm$^3$/g.

Macropores have, by definition, mean pore sizes (defined as the distance of opposing pore walls) of more than 50 nm. A great proportion of relatively large macropores in the core material in the size range of 250-10,000 nm promotes the absorption capacity for active material and the retention capacity. As for the electrical conductivity and the mechanical stability of the carbon structure, the volume fraction of macropores in the core is however not more than 5 cm$^3$/g.

By comparison, the volume fraction of mesopores and particularly of macropores in the shell is small, for they impair its function as a dense "shell" and its contribution to the electrical conductivity of the carbon structure, particularly also in the case of small layer thicknesses.

In view of this, a procedure is preferred in which a shell is produced in which pores with pore sizes in the range of 20-250 nm occupy a volume fraction of not more than 0.8 cm$^3$/g, preferably not more than 0.5 cm$^3$/g.

To achieve this, it has turned out to be advantageous to use a second precursor for graphitizable carbon, particularly pitch, for the infiltration according to method step (d).

Pitch is a carbonaceous material which partly shows an ordered liquid-crystalline structure. After carbonization, the infiltrated pitch melt forms a graphite-like layer structure which, although it may also contain turbostratic fractions, is more ordered and more graphite-like than the turbostratic carbon obtained from the non-graphitizable C precursor. The graphite-like carbon of the shell particularly exhibits a low microporosity and thus also a low specific surface area and a comparatively high electrical conductivity.

The carbon precursors are normally carbonized at a high temperature of up to 3000° C. in a gas, which is without oxygen if possible, or in vacuum. The minimum temperature for the carbonization is about 500° C. and follows from the decomposition temperature of the respective C precursor. An incipient carbide formation can set an upper limit for the carbonization temperature; e.g., in a $SiO_2$-containing template, it can limit the temperature to a temperature below 1000° C. because of the formation of SiC.

Hard templates of oxidic, nitridic, carbidic materials are suited as template material, but also templates consisting of other substances, such as plastics. Preferably, the template material is $SiO_2$. The provision of the template preferably comprises a soot deposition process in which a feedstock material is converted by hydrolysis or pyrolysis into template material particles, and these are deposited on a deposition surface. With such plasma or CVD type soot deposition methods, which are, for instance, known under the names OVD or VAD methods, synthetic quartz glass, tin oxide, titanium oxide, titanium nitride or other synthetic materials are produced on an industrial scale.

Synthetic $SiO_2$ can be produced on an industrial scale at relatively low costs by way of soot deposition methods using inexpensive start substances. The $SiO_2$ template withstands high temperatures during carbonization and is chemically inert up to at least 1000° C.

It is here essential for the qualification of the deposited template material for the production of a template that the template material is obtained on the deposition surface, which is e.g., a vessel, a mandrel, a plate or a filter, as porous "soot". This is ensured in that the temperature of the deposition surface is kept so low that a dense sintering of the deposited template material is prevented. A "soot body" which is thereby thermally consolidated, but is porous, is obtained as the intermediate product. It turns out to be particularly advantageous in the soot bodies obtained thereby that these have an anisotropic mass distribution with hierarchical pore structure due to the manufacturing process.

In the soot deposition process, the template material may also be obtained in the form of soot powder which is subsequently further processed by way of granulation, press, slurry or sinter methods into template particles. Granules or flakes should here be mentioned as intermediate products. The layer of the template material which has been produced by soot deposition can be comminuted with little efforts, resulting in template particles with platelet-like or flake-like morphology.

Such template particles which are distinguished by a non-spherical morphology are particularly advantageous for use in the method according to the present invention. The reason is that particles with a spherical morphology, i.e., particles with a sphere shape or an approximately spherical morphology, have a small surface in relation to their volume. By contrast, particles with a non-spherical morphology show a greater ratio of surface to volume, which simplifies and homogenizes the infiltration with the precursor.

By comparison with the generic prior art, the method according to the present invention is thus modified such that template material is provided in the form of template particles and the first precursor is provided in the form of precursor particles from fusible and polymerizable material, wherein infiltration is carried out in the melt phase such that the first precursor foams up before or during carbonization into a pore-containing carbon foam, resulting in an intermediate product in which pores of the template material are filled at least in part with a carbon foam. The intermediate product is ground into intermediate-product particles and subjected to melt infiltration together with fusible particles of the second precursor for the carbon, so that the melt of the second precursor penetrates into pores of the carbon foam and at least partly closes the same after carbonization as the shell of the core/shell structure.

This method is suited for producing carbon particles with core/shell structure according to the present invention, which shall be explained in more detail hereinafter.

As for these carbon particles, the above-mentioned objective, starting from porous carbon particles of the above-mentioned type, is achieved according to the present invention in that the first carbon variety forms carbon foam, and that a volume fraction of the carbon foam of not more than 30% is filled by a carbon which forms the shell of the core/shell structure and has the lower second porosity, so that the carbon particle contains extemplate pores and carbon foam pores, wherein the extemplate pores are produced by removing template material from an intermediate product, and wherein the carbon foam pores have a mean pore size in the range of 250 nm and 10,000 nm and occupy a pore volume which is greater at least by the factor 3 than the pore volume of the extemplate pores.

The carbon particles according to the present invention have volume portions with different pore characteristics:

Extemplate pores: A pore range which has been created by removal of the soot-like template material. These form voids (former spherical nanoparticles and the aggregates/agglomerates thereof) with a mean pore size in the range of 100 nm and 1,000 nm which are three-dimensionally interlinked via former, now opened, sinter necks. These connection channels form rather small voids with mean sizes in the range of mesopores and macropores, i.e., in the range of 2-50 nm, sometimes also slightly more. Hence, the extemplate pores show a bimodal or multimodal pore distribution, with a first maximum of the pore distribution at a mean pore size in the range of 2-50 nm and a second maximum of the pore distribution at a mean pore size in the range of 100 nm and 1,000 nm. They can predominantly be found in the core region of the core/shell structure, but also occur in the region of the shell.

Carbon foam pores: This pore range is formed by carbon foam. The foam substantially fills the pores of the original template material and forms walls of the extemplate pores mentioned under (a). The carbon foam is part of the core of the core/shell structure and has a specific BET surface area in the range of 400-600 $m^2/g$. It contains mesopores and a certain proportion of macropores, especially in the size range of 250 nm to 10,000 nm, wherein the macropore proportion preferably occupies a specific volume of at least 1.0 $cm^3/g$, particularly at least 2 $cm^3/g$. The carbon foam pores occupy a pore volume which is greater by at least the factor 3 than the pore volume of the extemplate pores.

Pores of the shell: A further pore range is found in the thin layer of hardly porous, graphite-like carbon of the shell of the core/shell structure. The shell exhibits a low porosity with predominantly small pores. These pores may be extemplate pores or they can be assigned to the "second porosity" of the less porous, "graphite-like carbon." A typical size of pores that are visible under the microscope is in the range of 20-250 nm and they represent a specific volume of preferably not more than 0.8 $cm^3/g$, particularly preferably not more than 0.5 $cm^3/g$, at that place. The specific BET surface area of the shell is preferably less than 50 $m^2/g$. The layer thickness of the shell can be small, with mean values between 2 μm and 5 μm. It fills the carbon foam in part, but not more than 30%, preferably not more than 10%.

During use of the carbon particles according to the present invention as an electrode material, the pore ranges (a) and (b) provide a pore space which is three-dimensionally interlinked via relatively narrow channels (former sinter necks) and used for absorbing and fixing electrolytic active material. This pore space is partly closed to the outside by the low-porosity carbon of the shell and is substantially impermeable to the active material fixed in the core. The shell thereby counteracts a washing out of active material from the pore space, but without preventing the accessibility of a liquid electrolyte to the core.

The macropores of the core of the carbon particles produced in this way are formed by extemplate pores and by carbon foam pores. The core is thus distinguished by a large pore volume and a high specific surface area with a large absorption volume for active material and allows a high charging capacity, whereas the shell is substantially impermeable to active material also at a small thickness, but allows an electrolytic access to the core and thereby ensures a high retention capacity and a low capacity loss.

The carbon particle is, e.g., used for producing an electrode layer of a secondary battery and is normally obtained with a platelet-like or flake-like morphology. Its layer thickness is advantageously in the order of magnitude of the electrode layer thickness. Mean thicknesses in the range of 5 μm to 100 μm, particularly preferably in the range of 25 μm to 75 μm, have turned out to be particularly useful. This avoids or reduces transition resistances between rather small, discrete carbon particles.

Production of Template Material with a Hierarchical Pore Structure

Figure 1:
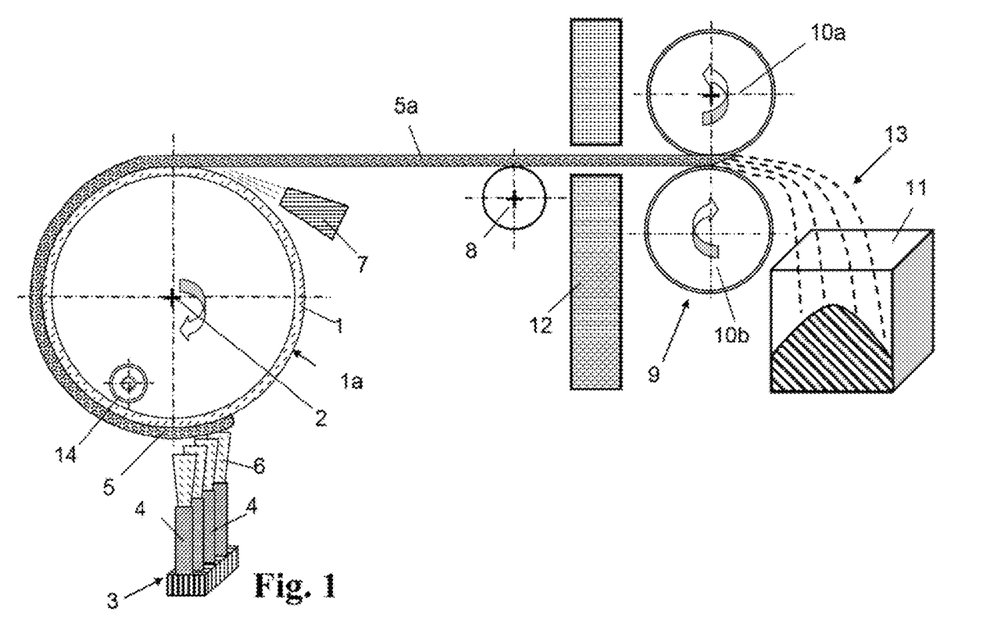
FIG. 1 shows an apparatus for producing a $SiO_2$ soot body in a schematic illustration.

The apparatus shown in FIG. 1 serves to produce porous granulate particles of $SiO_2$ which, in the present embodiment, are used for the method of the present invention as a hard template for producing porous carbon. The apparatus and the method for template production are explained in DE 10 2011 014 875 B3, the relevant content of which is herewith included in the present application.

The apparatus comprises a drum 1 which is rotatable about its rotation axis 2 and which consists of a base body made of special steel, which is covered with a thin layer of silicon carbide. The drum 1 has an outer diameter of 30 cm and a width of 50 cm. A layer 5 of $SiO_2$ soot is deposited on the outer surface 1a of the drum 1 and slightly thermally densified directly into a $SiO_2$ porous soot plate 5a.

Flame hydrolysis burners 4 are used for the soot deposition. Of these burners, four are arranged in successive order in a joint burner row 3 in the direction of the rotation axis 2 of the drum. The burner row 3 is reciprocated in parallel with the rotation axis 2 between two stationary turning points. The flame hydrolysis burners 4 are fed with oxygen and hydrogen as fuel gases and with octamethylcylcotetrasiloxane (OMCTS) as feedstock material for the formation of $SiO_2$ particles. The size of the $SiO_2$ primary particles produced thereby is in the nanometer range, wherein plural primary particles agglomerate in the burner flame 6 and are obtained in the form of more or less spherical aggregates with a specific BET surface area in the range of 25 m²/g, which form a continuous, uniformly thick $SiO_2$ soot layer 5 on the outer surface 1a of the drum.

The rotation speed of the drum 1 and the deposition rate of the flame hydrolysis burners 4 are matched such that one obtains a $SiO_2$ soot layer 5 with a width of about 40 cm and a thickness of about 45 μm (the soot layer is drawn in FIG. 1 with an exaggerated thickness for reasons of illustration). The burners 4 simultaneously effect a certain pre-sintering of the soot layer 5 into a soot plate 5a by producing a mean temperature of about 1200° C. on the surface of the topmost soot layer. The pre-sintering process is supported by a tubular infrared radiator 14 which is arranged within the drum 1, which is formed as a hollow drum, in the left lower quadrant, and which heats the outer surface of the drum 1 from the inside shortly after the application of the soot layer 5.

The porous and slightly pre-sintered soot plate 5a obtained in this way has a mean relative density of about 22% (based on the density of quartz glass with 2.21 g/m³).

After slightly more than half a drum revolution, the soot plate 5a passes into the exposure area of a blower 7 by means of which a gas stream is produced that is directed against the bottom side of the soot plate 5a, so that the soot plate 5a lifts off from the outer surface 1a of the drum.

The soot plate 5a is subsequently supplied via a support roll 8 to a crushing tool 9 which consists of two counter-rotating rolls 10a, 10b between which a gap is provided having the thickness of the soot plate 5a, and the surfaces of which are provided with longitudinal profiles.

The soot plate 5a which passes through the gap is comminuted by the longitudinal profiles of the rolls 10a, 10b into fragments having about the same size (granulate particles 13), which are collected in a collection container 11.

A partition wall 12 is provided between the drum 1 and the crushing tool 9. The partition wall is here provided with an opening for passing the soot plate 5a therethrough and serves to shield the soot deposition process against the effects of the comminuting process.

The granulate particles 13 obtained according to the method have a platelet- or flake-like morphology and a thickness that corresponds approximately to the thickness of the soot plate 5a, i.e., about 45 μm. Due to the crushing operation described, the granulate particles 13 also have about the same size, so that a narrow grain size distribution is achieved.

Figure 2A:
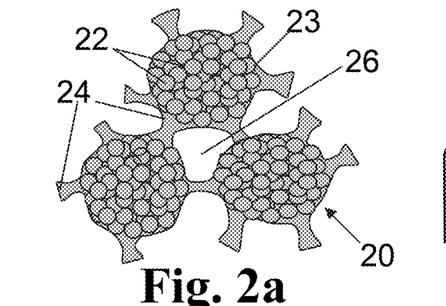
FIGS. 2 to 5 show method steps for producing carbon particles according to an embodiment of the present invention in a schematic illustration, wherein row (a) is each time a top view of a particle and row (b) is a cut-through view of the particle.
Figure 2B:
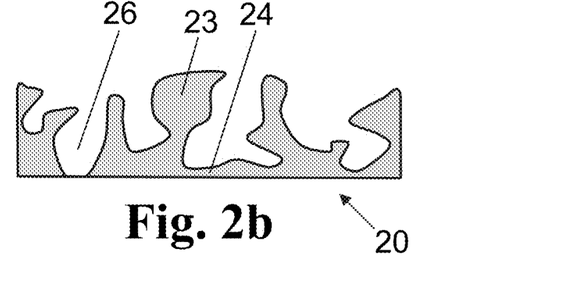

Due to the manufacturing process, these granulate particles 13 have an anisotropic mass distribution with a hierarchical pore structure, as schematically shown in FIG. 2a. This pore structure is due to the fact that during gas phase deposition $SiO_2$ primary particles 22 are formed in the reaction zone with particle sizes in the nanometer range. These agglomerate on their way to the deposition surface and are obtained in the form of more or less secondary particles 23 on the deposition surface. These "secondary particles" 23 consist of a different number of primary particles 22 and are interconnected via so-called sinter necks 24. Particularly small voids and interspaces in the nanometer range (mesopores) are present within the secondary particles 23—between the primary particles 22—(not visible in FIG. 2a), whereas macropores with typical clear widths of about 400 nm to 1,000 nm are formed between the individual secondary particles 23.

Preparation of a Dry Mixture of Particles of the Template Material and a Carbon Precursor Capable of Forming a Foam for Porous Carbon By grinding cane sugar and by sieving, a fine-grained cane sugar fraction is formed, consisting essentially of spherical particles with particle sizes between 5 μm and 20 μm. The cane sugar and also the above-explained granulate particles with thicknesses in the range of 20 μm and 50 μm are homogeneously intermixed in the weight ratio 50:50.

Fusion of the Particle Mixture and First Homogeneous Infiltration

The particle mixture is heated to a temperature of about 160° C. Cane sugar becomes viscous in this process and starts to decompose. At the same time, the viscous cane-sugar melt covers the $SiO_2$ granulate particles and penetrates into the pores. The ratio of cane sugar mass and granulate particle mass is chosen such that the cane sugar melt fills the pores, so that no significant free pore volume remains and is almost completely consumed. After an infiltration period of about 30 min, the homogeneous infiltration of the pores is substantially completed. The pores of the granulate particles are now substantially filled with a molten cane sugar mass.

The temperature is then slowly raised to about 205° C. and kept for about 60 min. At this temperature cane sugar is subjected under dehydrating conditions to a swift polycondensation reaction with separation of water. Until the complete conversion into carbon, the remaining cane sugar melt is still substantially plastically deformable. As a consequence, the evaporating water released in the polycondensation reaction can cause the formation of bubbles which manifests itself as a foam formation of the cane sugar. This bubble formation may lead to relatively large bubbles within the macroporosity of the granulate particles, so that the pores are filled at least in part or ideally completely with foam due to a comparatively large bubble volume.

Carbonization

Figure 3A:
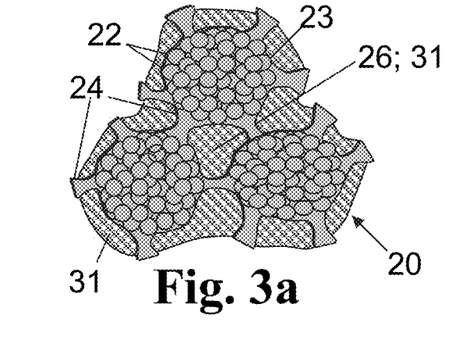
Figure 3B:
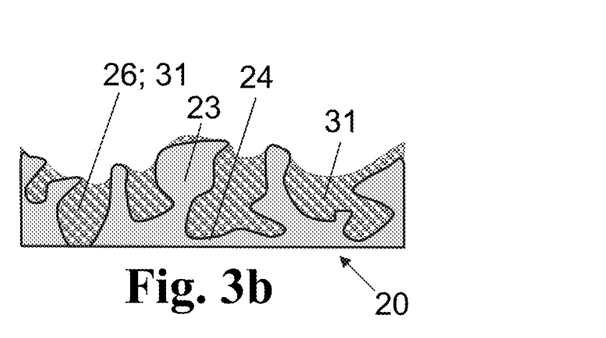

After completion of the foam forming process, the treatment temperature is raised to about 650° C. and the previously foamed cane sugar is carbonized in a nitrogen atmosphere into porous turbostratic carbon. After complete carbonization, one obtains a composite mass of porous $SiO_2$ granulate particles and carbon foam as an "intermediate product." This process stage is schematically illustrated in FIGS. 3a and 3b. The secondary particles 23 are covered on the outside and the inside with a layer of porous carbon foam 31, particularly also the former pores 26 between the secondary particles 23. The porosity of the carbon foam 31 is formed predominantly (more than 50% of the pore volume) by mesopores and macropores with pore sizes in the range of 200 nm to 1000 nm.

Figure 6:
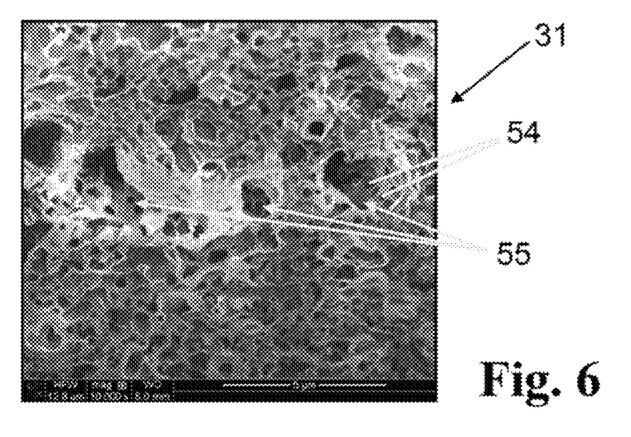
FIG. 6 is a SEM image of the core of a carbon particle according to an embodiment of the present invention with high porosity.

The SEM image of FIG. 6 shows the resulting pore distribution with a multitude of coherent pores and voids of different sizes. Multiple voids 55 of a rather large size are distributed in the spongy mass and are surrounded by rather small voids or channels 54. A measurement of the specific internal surface area according to the BET method yields measurement values of about 450 m²/g.

Figure 9:
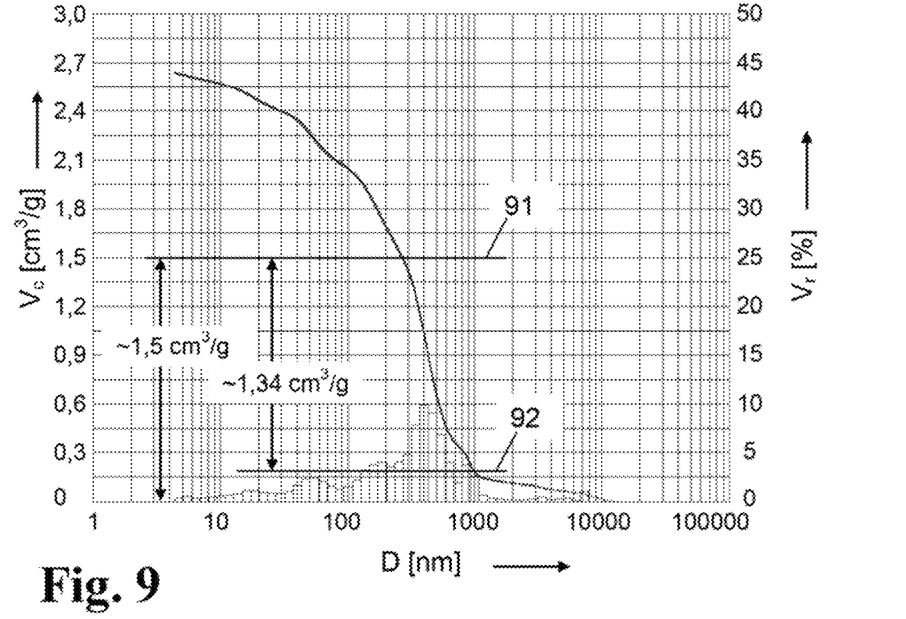
FIG. 9 is a diagram of the pore size distribution of the high-porosity core.

The diagram of FIG. 9 shows the pore size distribution of the carbon foam. The cumulative pore volume $V_c$ in [cm³/g] is plotted on the left ordinate and the relative pore volume $V_r$ in [%] on the right ordinate against the pore diameter D in [nm]. It can be seen that a first maximum of the pore size distribution lies in the mesopore range of about 50 nm and a second maximum of the pore size distribution in the macropore range at pore sizes of 250 nm to 1000 nm. There are also some larger pores with D values of up to about 10,000 nm. Macropores in the order of 250-10,000 nm yield a total pore volume of about 1.5 cm³/g (difference of the cumulative pore volume between the zero line and line 91), but micropores in the order of 250-1,000 nm represent the greatest part of the pore volume. These yield a total pore volume of about 1.34 cm³/g (difference of the cumulative pore volume between the lines 91 and 92).

It should here be noted that the measurement results shown were obtained by way of mercury porosimeter measurement. The technique is based on the intrusion of the non-wetting liquid mercury into a porous system under pressure. This method furnishes reliable information on the pore size distribution, the pore volume, the apparent and true density in the range of macropores up to large mesopores, but not for pores in the nanometer range, resulting in a discrepancy for the specific surface area with respect to the value of 450 m²/g determined according to the BET method. This can be explained by the fact that the pores in the nanometer range, which represent a large fraction in relation to the total inner surface, cannot be detected by mercury porosimeter measurement.

Grinding of the Intermediate Product

The "intermediate product" is obtained as a slightly agglomerated mass. It is gently broken and comminuted by using an impact jet mill into intermediate product particles with particle sizes in the range between 25 μm and 75 μm. The fine fraction with particle sizes <25 μm is removed.

Preparation of a Dry Mixture Consisting of Intermediate-Product Particles and a Carbon Precursor for Graphite-Like Carbon The grinding of mesophase pitch and sieving lead to a pitch powder which consists essentially of spherical particles with particle sizes of about 5 μm. The pitch powder and the intermediate-product particles are homogeneously intermixed in the weight ratio 1:6.

Fusion of the Particle Mixture and Second Inhomogeneous Infiltration

The particle mixture is heated to a temperature of 300° C. The viscous pitch surrounds the intermediate-product particles and penetrates into the superficially exposed carbon foam pores. The ratio of pitch and intermediate-product particle volume is chosen such that an "inhomogeneous infiltration" occurs, i.e., a complete penetration of the carbon foam is ruled out. Rather, only a penetration of the pitch into near-surface regions of the carbon foam is possible.

After completion of the infiltration step the viscous pitch has substantially closed the carbon foam pores which are present on the surface of the intermediate product particles, without having otherwise penetrated into the carbon foam to a particularly great depth. The penetration depth varies, depending on porosity, and corresponds approximately to a mean layer thickness in the range of 1-5 μm. Hence, a significant free pore volume of the carbon foam still remains after inhomogeneous infiltration.

Carbonization

Figure 4A:
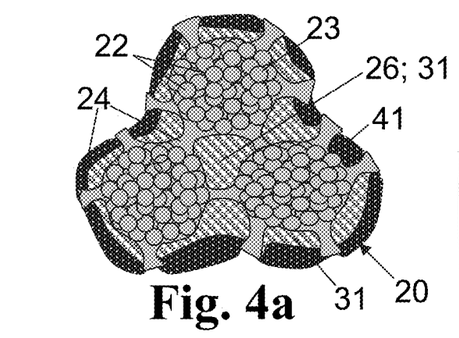
Figure 4B:
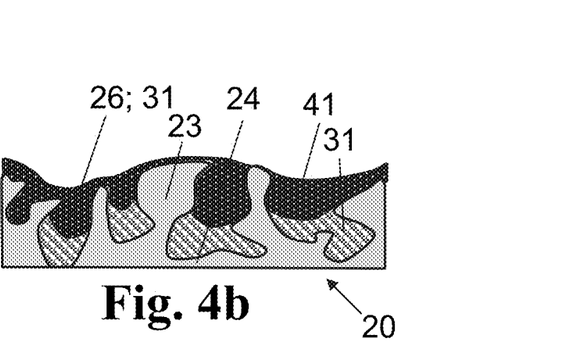

After an infiltration period of 30 m the temperature is raised to 700° C. and the pitch is thereby carbonized. This process stage is schematically illustrated in FIGS. 4a and 4b. The surfaces of the former intermediate-product particles—these are substantially the secondary particles 23 penetrated and occupied by carbon foam 31—are here covered with a shell 41 of graphite-like carbon. This shell 41 closes previously open pores of the porous carbon foam 31 partly to the outside, as is particularly shown by the view in FIG. 4b. It forms an "outer skin" or "shell" within the meaning of the present invention. The carbon foam 31 adjoining the surface of the carbon particles is here filled on average to less than 10%, with the near-surface carbon foam pores being substantially closed by graphite-like carbon.

This yields a porous composite mass of non-spherical porous intermediate-product particles that have a core of template material and carbon foam which is covered with a thin shell of low-pore graphite-like carbon.

Figure 7:
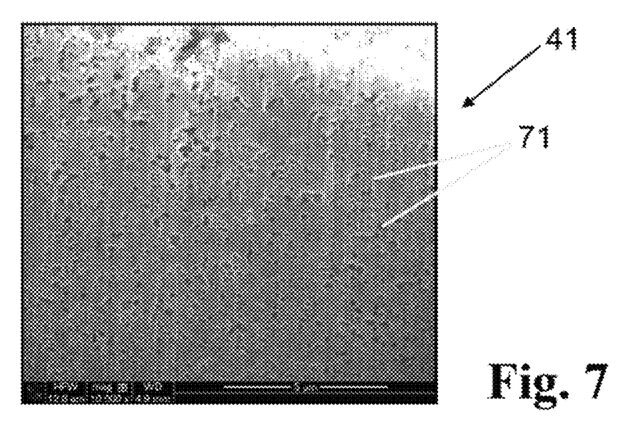
FIG. 7 is a SEM image of the outer skin of a carbon particle according to an embodiment of the present invention with low porosity.

The SEM image of FIG. 7 shows the pore distribution of the shell 41 with the same magnification as the carbon foam 31 of FIG. 6. A number of small pores 71 are visible, but hardly any macropores. A measurement of the specific internal surface area of this material according to the BET method yields measurement values of around 25 m²/g (in the case of a layer with free surfaces at bottom/top side).

Figure 10:
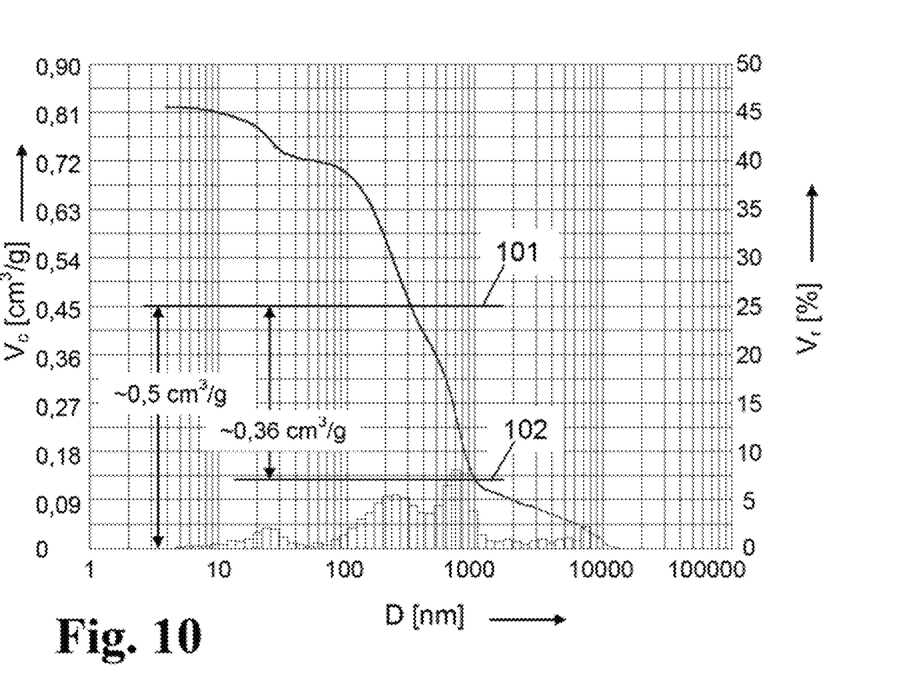
FIG. 10 is a diagram of the pore size distribution of the low-porosity shell.

The diagram of FIG. 10 shows the pore size distribution of the shell 41. The total porosity of the carbon shell 41 is 0.81 cm³/g and is thus clearly lower than the total porosity of the carbon foam 31, which is about 2.65 cm³/g (see FIG. 9). Some larger pores with D values of up to about 10,000 nm are also measured in the shell 41. Macropores in the order of 250-10,000 nm yield a total pore volume of about 0.5 cm³/g (difference of the cumulative pore volume between the zero line and line 101). The pore volume with macropores in the order of 250-1,000 nm is 0.36 cm³/g (difference of the cumulative pore volume between the lines 101 and 102).

Removal of the Template Material

The $SiO_2$ template material of the granulate particles is subsequently removed by introducing the composite mass into a hydrofluoric acid bath. After the SiO$_2$ mass has been etched away, the material is flushed and dried. This yields flakes of porous carbon.

Figure 5A:
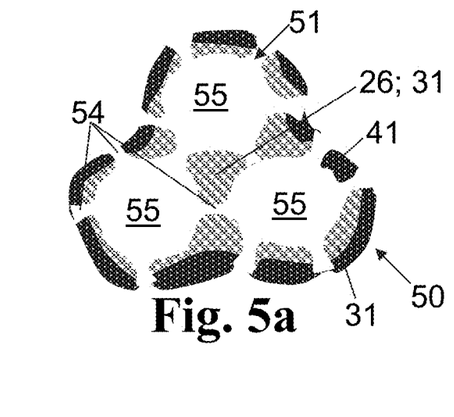
Figure 5B:
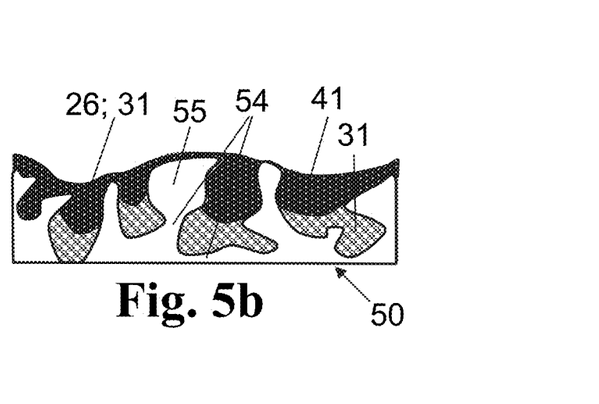
Figure 11:
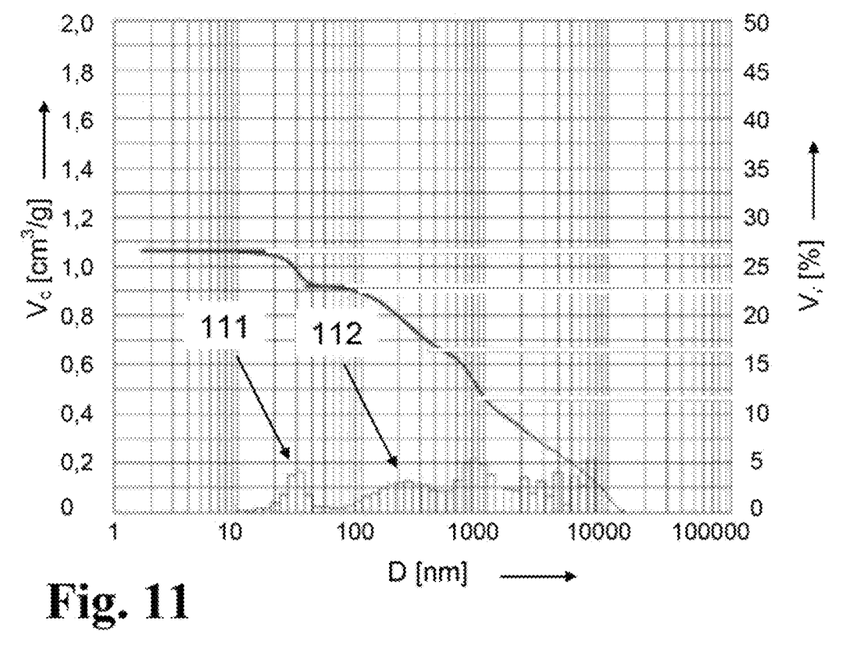
FIG. 11 is a diagram of the pore size distribution of carbon particles without core/shell structure, obtained according to a template method.

Such a porous carbon particle 50 is schematically shown in FIGS. 5a and 5b. The network-like coherent template volume which has previously been occupied by SiO$_2$ now forms a coherent pore space 51 of small and large extemplate pores (54; 55) with bimodal pore size distribution. The maximum 111 of the pore size distribution of the smaller extemplate pores is around 25 nm and the maximum 112 of the pore size distribution of the larger extemplate pores is around 250 nm. The pore size distribution shown in the diagram of FIG. 11 reflects this multimodal pore size distribution of "extemplate pores," as obtained after removal of the template material, if neither a core/shell structure nor pronounced carbon foam pores are present in the resulting carbon particles. The distribution maximum 111 at rather small pore sizes is due to former sinter necks or gussets of incompletely sintered particles, but also due to small holes in the walls of the carbon layer. Especially the distribution maximum 112 in the case of rather large pores depends considerably on the sizes of the SiO$_2$ particle agglomerates formed in the soot deposition method and on the sintering conditions and may be in a range of about 100-1000 nm. It should also be noted that the measurement method can only approximate the real pore sizes and the specification of the pore sizes is based on ideally cylindrical or spherical pores. This, however, cannot be expected in the real system. In the case of the carbon particles produced according to the method of the present invention with core/shell structure and pronounced carbon foam pores, these extemplate pores that are solely due to the former template structure show a similar distribution as in FIG. 11. They extend, however, through both the carbon foam 31 and, although to a lesser degree, through the shell 41 consisting of less porous, graphite-like carbon. The core of this carbon particle 50 contains voids 55 which are three-dimensionally interlinked via former, now opened, channels 54. The extemplate pores have mean sizes in the range of mesopores and macropores, more exactly in the range of 2 nm to more than 50 nm (former sinter necks) and mean sizes in the range of 100 nm to 1,000 nm (former template particles).

Carbon foam 31 which substantially fills the pores of the original template material and provides mesopores and a certain proportion of macropores. This carbon foam 31 occupies a pore volume which is greater by about the factor 3 than the pore volume of the extemplate pores.

Figure 8:
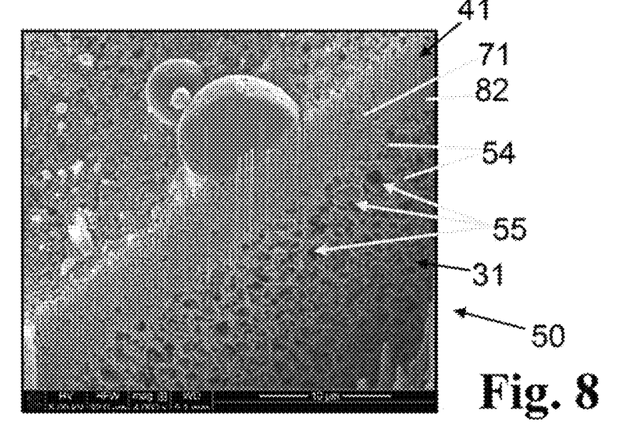
FIG. 8 is a SEM image of the contact area of core and shell in a carbon particle according to an embodiment of the present invention.

The carbon particle 50 obtained thereby is relatively filigree and fragile. It is suited for use as electrode material for electrochemical cells in batteries and secondary batteries. The SEM image according to FIG. 8 shows the boundary 82 between carbon foam 31 and shell 41. The large inner surface of the carbon foam 31 in combination with the three-dimensional pore space formed by channels 54 and large voids 55 (macropores) can fix and retain substances. The escape of these substances is restricted by comparatively narrow channels 54 which interconnect the voids 55, and by the dense shell 41 having few small pores 71, which completes the carbon foam to the outside. The carbon foam 31 and also the shell 41 (outer skin) are penetrated by a multitude of smaller pores (mesopores) which are mainly small extemplate pores.

The sulfur compounds which are formed and released during discharge of a lithium-sulfur battery are physically bound in the core region of the carbon particle 50, whereby it is prevented that they are evenly distributed in the electrolyte and are thus no longer available for the electrochemical reaction.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Porous carbon particles having a core/shell structure, the porous carbon particles comprising:
   a core of a first carbon variety with a first porosity; and
   a shell which surrounds the core and consists of a second carbon variety with a second porosity which is lower than the first porosity,
   wherein the first carbon variety forms carbon foam, a pore volume of the carbon foam is filled up to not more than 30% by the second carbon variety forming the shell of the core/shell structure with the second porosity, so that the porous carbon particles contain voids and carbon foam pores,
   wherein the voids have a mean size in the range of 100 nm to 1,000 nm and are connected via connection channels, and
   wherein the carbon foam pores have a mean pore size in the range of 250 nm to 10,000 nm and wherein a pore volume of the carbon foam pores is greater at least by a factor of 3 than a pore volume of the voids.

2. Porous carbon particles according to claim 1, wherein the pore volume of the carbon foam is filled up to not more than 10% by the second carbon variety.

3. Porous carbon particles according to claim 1, wherein the shell has a mean thickness of not more than 5 μm.

4. Porous carbon particles according to claim 1, wherein the voids have a multimodal pore distribution, with a first maximum of the multimodal pore distribution at a mean pore size in the range of 2 nm to 50 nm and a second maximum of the multimodal pore distribution at a mean pore size in the range of 100 nm to 1,000 nm.

5. Porous carbon particles according claim 1,
   wherein the core has a specific BET surface area in the range of 400-600 m$^2$/g and the shell has a specific BET surface area in the range of less than 50 m$^2$/g,
   wherein the carbon foam pores contain macropores in the size range of 250 nm to 10,000 nm, which occupy a specific volume of at least 1.0 cm$^3$/g, and
   wherein pores of the shell have pore sizes in the range of 20 nm to 250 nm and which occupy a specific volume of not more than 0.8 cm$^3$/g.

6. Porous carbon particles according to claim 1, wherein the porous carbon particles have a platelet or flake morphology and a mean thickness in the range of 5 μm to 100 μm.

7. Porous carbon particles according claim 1,
   wherein the core has a specific BET surface area in the range of 400-600 m$^2$/g and the shell has a specific BET surface area in the range of less than 50 m$^2$/g,
   wherein the carbon foam contains macropores in the size range of 250 nm to 10,000 nm, which occupy a specific volume of at least 2 cm$^3$/g, and
   wherein pores of the shell have pore sizes in the range of 20 nm to 250 nm and which occupy a specific volume of not more than 0.5 cm$^3$/g.

8. Porous carbon particles according to claim 6, wherein the porous carbon particles have a mean thickness in the range of 25 μm to 75 μm.

* * * * *